United States Patent
Ueno et al.

(10) Patent No.: US 6,756,172 B2
(45) Date of Patent: Jun. 29, 2004

(54) RESIN BINDER

(75) Inventors: Tetsuya Ueno, Wakayama (JP);
Yoshihiro Ueno, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/263,706

(22) Filed: Oct. 4, 2002

(65) Prior Publication Data

US 2003/0104301 A1 Jun. 5, 2003

(30) Foreign Application Priority Data

Oct. 5, 2001 (JP) ........................................ 2001-309866

(51) Int. Cl.$^7$ .............................................. G03G 9/087
(52) U.S. Cl. ..................................... 430/109.4; 528/272
(58) Field of Search ....................... 430/109.4; 528/272

(56) References Cited

U.S. PATENT DOCUMENTS

| | | | |
|---|---|---|---|
| 4,863,824 A | 9/1989 | Uchida et al. | |
| 5,234,787 A | 8/1993 | Morimoto et al. | |
| 5,330,870 A * | 7/1994 | Tanaka et al. | 430/109.4 |
| 6,335,137 B1 | 1/2002 | Suzuki et al. | |
| 6,361,914 B1 | 3/2002 | Semura et al. | |
| 6,509,130 B1 * | 1/2003 | Semura et al. | 430/109.4 |

FOREIGN PATENT DOCUMENTS

| | | |
|---|---|---|
| JP | 62-214368 | 10/1985 |
| JP | 62-225244 | 9/1988 |
| JP | 63-225245 | 9/1988 |
| JP | 63-225246 | 9/1988 |
| JP | 4-362956 | 12/1992 |
| JP | 2000-039738 | 2/2000 |
| JP | 2000-356865 | 12/2000 |

* cited by examiner

Primary Examiner—John L Goodrow
(74) Attorney, Agent, or Firm—Oblon, Spivak, McClelland, Maier & Neustadt, P.C.

(57) ABSTRACT

A resin binder comprising a specified nonlinear polyester having a softening point of from 130° to 160° C. and a specified linear polyester having a softening point of from 80° to 110° C. The resin binder for a toner can be used for developing electrostatic latent images formed in electrophotography, electrostatic recording method, electrostatic printing, and the like.

20 Claims, No Drawings

RESIN BINDER

BACKGROUND OF THE INVENTION

1. Field of the Invention

The present invention relates to a resin binder for a toner used for developing electrostatic latent images formed in electrophotography, electrostatic recording method, electrostatic printing, and the like, preferably a toner for electrophotography, and a toner comprising the resin binder.

2. Discussion of the Related Art

Conventionally, as resin binders for a toner which are excellent in various properties required for copy machines, especially excellent in the low-temperature fixing ability and the offset resistance, there have been known a resin binder prepared by mixing a nonlinear high-softening point resin and a nonlinear low-softening point resin (Japanese Patent Laid-Open Nos. Sho 63-225246, Sho 63-225245, Sho 63-225244, 2000-356865, and the like); a resin binder prepared by mixing a nonlinear high-softening point resin and a linear low-softening point resin (Japanese Patent Laid-Open Nos. Sho 60-214368, Hei 4-362956, 2000-39738, Hei 12-39738, and the like); and the like. However, in the former resin binder, since a nonlinear resin is used as a low-softening point resin, the glass transition point is lowered, so that its storage property is unsatisfactory. In the latter resin, specifying the raw material monomers is insufficient, and the storage property, the pulverizability, and the offset resistance are unsatisfactory.

Further, recently, since network printing has become the main trend for copy machines and printers, further improvement has been desired such as suppression of toner odor to make it environment-friendly upon use in addition to the conventionally required properties such as toner performance and production efficiency during its use in a business office.

An object of the present invention is to provide a resin binder which is excellent in fixing ability, offset resistance, storage property and pulverizability and generates little odor even when used as a resin binder for a toner, and a toner comprising the resin binder.

These and other objects of the present invention will be apparent from the following description.

SUMMARY OF THE INVENTION

According to the present invention, there are provided:

(1) a resin binder comprising a nonlinear polyester having a softening point of from 130° to 160° C. and a linear polyester having a softening point of from 80° to 110° C., wherein the nonlinear polyester is obtained by polycondensing an alcohol component and a carboxylic acid component, wherein 1) an aliphatic dicarboxylic acid compound is contained in an amount of 60% by mol or more of the carboxylic acid component;

2) (i) no alkenylsuccinic acid compound is contained, or
(ii) if any, an alkenylsuccinic acid compound is contained in an amount of 0.1% by mol or less of the carboxylic acid component; and 3) at least one component selected from the group consisting of:
(i) a trihydric or higher polyhydric alcohol in an amount of from 0.1 to 40% by mol of the alcohol component; and
(ii) a tricarboxylic or higher polycarboxylic acid compound in an amount of from 0.1 to 40% by mol of the carboxylic acid component
is contained, and wherein the linear polyester is obtained by polycondensing an alcohol component and a carboxylic acid component, wherein 1) an aromatic dicarboxylic acid compound is contained in an amount of 90% by mol or more of the carboxylic acid component; and 2) at least one component selected from the group consisting of (a) and (b):
(a)
(i) no trihydric or higher polyhydric alcohol, or
(ii) if any, a trihydric or higher polyhydric alcohol is contained in an amount of less than 0.05% by mol of the alcohol component; and
(b) (i) no tricarboxylic or higher polycarboxylic acid compound, or
(ii) if any, a tricarboxylic or higher polycarboxylic acid compound in an amount of less than 0.05% by mol of the carboxylic acid component
is contained; and (2) a toner comprising the resin binder of item (1) above.

DETAILED DESCRIPTION OF THE INVENTION

The resin binder of the present invention comprises a nonlinear polyester having a high softening point and a linear polyester having a low softening point. In the present invention, by specifying each of raw material monomers for the nonlinear polyester having a high softening point and the linear polyester having a low softening point, there can be obtained a resin binder for a toner which is not only excellent in fixing ability, offset resistance, storage property and pulverizability but also generates little odor upon heating, thereby making the toner environmental-friendly.

Specifically, the nonlinear polyester is obtained by polycondensing an alcohol component and a carboxylic acid component, wherein 1) an aliphatic dicarboxylic acid compound is contained in an amount of 60% by mol or more of the carboxylic acid component;

2) (i) no alkenylsuccinic acid compound is contained, or
(ii) if any, an alkenylsuccinic acid compound is contained in an amount of 0.1% by mol or less of the carboxylic acid component; and 3) at least one component selected from the group consisting of:
(i) a trihydric or higher polyhydric alcohol in an amount of from 0.1 to 40% by mol of the alcohol component; and
(ii) a tricarboxylic or higher polycarboxylic acid compound in an amount of from 0.1 to 40% by mol of the carboxylic acid component
is contained.

The polyester obtained from an aliphatic dicarboxylic acid compound as a raw material monomer has a higher molecular weight at the same softening point, as compared to the polyester using the aromatic compound. Therefore, despite the low lowest fixing temperature, the polyester is effective in improvement of the offset resistance, so that its performance can be sufficiently exhibited by using the polyester as a main component for the high-softening point polyester.

The aliphatic dicarboxylic acid compound includes oxalic acid, malonic acid, maleic acid, fumaric acid, citraconic acid, itaconic acid, glutaconic acid, succinic acid, adipic acid, acid anhydrides thereof, $C_{1-3}$ alkyl esters of these acids, and the like. The aliphatic dicarboxylic acid compound has preferably from 2 to 10 carbon atoms, more preferably 4 to 6 carbon atoms. Incidentally, as described above, the aliphatic dicarboxylic acid compound refers to aliphatic dicarboxylic acids, acid anhydrides thereof and $C_{1-3}$ alkyl esters of these acids, among which aliphatic dicarboxylic acids are preferable.

It is desirable that the aliphatic dicarboxylic acid compound is contained in the carboxylic acid component in an amount of 60% by mol or more, preferably from 60 to 99.9% by mol, more preferably from 65 to 90% by mol.

However, a substituted succinic acid of which substituent is an alkenyl group having 2 to 20 carbon atoms, such as dodecenylsuccinic acid and isooctenylsuccinic acid, generates irritable odor upon heat-fixing. Therefore, the content of the substituted succinic acid is preferably as low as possible. Accordingly, no alkenylsuccinic acid compound is contained, or if any, its content in the carboxylic acid component is in an amount of 0.1% by mol or less, preferably 0.05% by mol or less. It is preferable that no alkenylsuccinic acid compound is contained.

As other dicarboxylic acid component, there may be used aromatic dicarboxylic acids such as phthalic acid, isophthalic acid, and terephthalic acid, acid anhydrides thereof, $C_{1-3}$ alkyl esters of these acids, and the like.

Further, in order to form a nonlinear structure and improve offset resistance or the like, there are used trivalent or higher polyvalent monomers, namely trihydric or higher polyhydric alcohol and/or tricarboxylic or higher polycarboxylic acid compound. As the trivalent or higher polyvalent monomers, the tricarboxylic or higher polycarboxylic acid compound is preferable, from the viewpoint of improvement efficiency of the offset resistance.

The tricarboxylic or higher polycarboxylic acid compound includes, for instance, 1,2,4-benzenetricarboxylic acid (trimellitic acid), 2,5,7-naphthalenetricarboxylic acid, pyromellitic acid, acid anhydrides thereof, lower $C_{1-3}$ alkyl esters of these acids, and the like.

The trihydric or higher polyhydric alcohol component includes, for instance, sorbitol, pentaerythritol, glycerol, trimethylolpropane, and the like.

Each of the content of the trihydric or higher polyhydric alcohol component in the alcohol component and/or the content of the tricarboxylic or higher polycarboxylic acid compound in the carboxylic acid component is from 0.1 to 40% by mol, preferably from 5 to 35% by mol, more preferably from 15 to 30% by mol.

In addition, the dihydric alcohol component includes a compound represented by the formula (I):

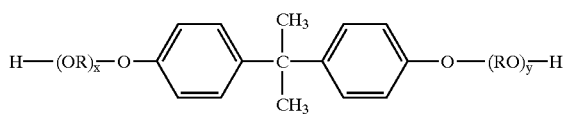

(I)

wherein R is an alkylene group having 2 or 3 carbon atoms; each of x and y is a positive number, wherein a sum of x and y is from 1 to 16, preferably from 1.5 to 5.0, including, for instance, an alkylene(2 to 3 carbon atoms) oxide(average number of moles: 1 to 16) adduct of bisphenol A such as polyoxypropylene(2.2)-2,2-bis(4-hydroxyphenyl)propane and polyoxyethylene(2.0)-2,2-bis(4-hydroxyphenyl) propane, and the like; ethylene glycol, 1,2-propylene glycol, 1,4-butanediol, neopentyl glycol, polyethylene glycol, polypropylene glycol, bisphenol A, hydrogenated bisphenol A, and the like.

In any of the nonlinear polyester and the linear polyester described below, the main component of the alcohol component is preferably the compound represented by the formula (I), from the viewpoints of storage property and low-temperature fixing ability, of which content in the alcohol component is preferably 50% by mol or more, more preferably from 70 to 100% by mol, still more preferably 100% by mol.

The linear polyester is obtained by polycondensing an alcohol component and a carboxylic acid component, wherein 1) an aromatic dicarboxylic acid compound is contained in an amount of 90% by mol or more of the carboxylic acid component; and
2) at least one component selected from the group consisting of (a) and (b):
    (a) (i) no trihydric or higher polyhydric alcohol, or
        (ii) if any, a trihydric or higher polyhydric alcohol is contained in an amount of less than 0.05% by mol of the alcohol component; and
    (b) (i) no tricarboxylic or higher polycarboxylic acid compound, or
        (ii) if any, a tricarboxylic or higher polycarboxylic acid compound in an amount of less than 0.05% by mol of the carboxylic acid component
    is contained.

The polyester obtained from an aromatic dicarboxylic acid compound as a raw material monomer has a lower molecular weight at the same softening point, as compared to the polyester using the aliphatic carboxylic compound. The polyester is excellent in the pulverizability, and also excellent in the storage property because of its high glass transition point, so that its performance can be sufficiently exhibited by using the polyester as a main component for the low-softening point polyester.

The aromatic dicarboxylic acid compound includes phthalic acid, isophthalic acid, and terephthalic acid, acid anhydrides thereof, $C_{1-3}$ alkyl esters of these acids, and the like. Incidentally, as described above, the aromatic dicarboxylic acid compound refers to aromatic dicarboxylic acids, acid anhydrides thereof and $C_{1-3}$ alkyl esters of these acids, among which aromatic dicarboxylic acids are preferable.

The content of the aromatic dicarboxylic acid compound in the carboxylic acid component is 90% by mol or more, preferably from 95 to 100% by mol, more preferably 100% by mol.

As other dicarboxylic acid component, there may be used the aliphatic dicarboxylic acid compounds mentioned above, and the like.

In the linear polyester, it is also preferable that the content of the alkenylsuccinic acid compound is as low as possible. Therefore, no alkenylsuccinic acid compound is contained, or if any, its content in the carboxylic acid component is in an amount of preferably 0.1% by mol or less, more preferably 0.05% by mol or less.

In addition, in order to form a linear structure, it is preferable that the content of the trivalent or higher polyvalent monomers is low as possible. No trihydric or higher polyhydric alcohol component or no tricarboxylic or higher polycarboxylic acid is contained, or if any, each content of the trihydric or higher polyhydric alcohol component in the alcohol component and/or the tricarboxylic or higher polycarboxylic acid compound in the carboxylic acid component is less than 0.05% by mol.

As the dihydric alcohol component, there may be exemplified the same alcohols as those for the nonlinear polyester mentioned above.

The polyester, regardless of being nonlinear or linear, can be prepared by the polycondensation of the alcohol component with the carboxylic acid component, and the like at a temperature of from 180° to 250° C. in an inert gas atmosphere, using an esterification catalyst as occasion demands.

In the present invention, since a specified high-softening point polyester and a specified low-softening point polyester are used in combination, the offset resistance is improved due to the high-softening point polyester and the pulverizability, the storage property and the fixing ability are respectively improved due to the low-softening point polyester, so that excellent synergistic effects which are not obtained by a single resin are exhibited.

Therefore, the nonlinear polyester has a softening point of from 130° to 160° C., preferably from 140° to 160° C., more preferably from 140° to 150° C., from the viewpoints of the offset resistance and the pulverizability, and the linear polyester has a softening point of from 80° to 110° C., preferably from 85° to 107° C., more preferably from 90° to 105° C., from the viewpoints of the fixing ability and the storage property.

The weight ratio of the nonlinear polyester to the linear polyester in the resin binder of the present invention, i.e. nonlinear polyester/linear polyester, preferably from 90/10 to 20/80, more preferably from 80/20 to 30/70, especially preferably from 75/25 to 40/60.

The toner of the present invention may contain, in addition to the resin binder of the present invention, a styrene-acrylic resin, a composite resin of a polyester and a styrene-acrylic resin, an epoxy resin, a urethane resin or the like, in an amount so as not to impair the effects of the present invention. Further, the toner may appropriately contain an additive such as a colorant, a charge control agent, a releasing agent, a fluidity improver, an electric conductivity modifier, an extender, a reinforcing filler such as a fibrous substance, an antioxidant, an anti-aging agent, or a cleanability improver.

As the colorant, all of the dyes and pigments which are used as colorants for a toner can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow and the like. These colorants can be used alone or in admixture of two or more kinds. The toner of the present invention can be used as any of black toners, monochromatic toners, and full color toners. The content of the colorant is preferably from 1 to 40 parts by weight, more preferably from 3 to 10 parts by weight, based on 100 parts by weight of the resin binder.

The process for preparing a toner of the present invention may be any of known methods such as a kneading-pulverization method, a polymerization method, a phase-inversion method or the like. In a case where the toner is a pulverized toner prepared by a kneading-pulverization method, for instance, the toner is prepared by the step comprising homogeneously pre-mixing a resin binder, a colorant or the like in a mixer such as a Henschel mixer or a ball-mill, thereafter melt-kneading the mixture with a closed kneader, a single-screw or twin-screw extruder, or the like, cooling, pulverizing and classifying the product. The volume-average particle size of the toner thus obtained is preferably from 3 to 15 μm. Further, a fluidity improver or the like such as hydrophobic silica may be added to the surface of the toner.

The toner of the present invention is used alone as a developer, in a case where the fine magnetic material powder is contained. Alternatively, in a case where the fine magnetic material powder is not contained, the toner may be used as a nonmagnetic monocomponent developer, or the toner can be mixed with a carrier and used as a two-component developer.

EXAMPLES

[Softening Point]

The softening point refers to a temperature at which a half of the resin flows out, when measured by using a flow tester of the "koka" type "CFT-500D" (commercially available from Shimadzu Corporation) (sample: 1 g, rate of raising temperature: 6° C./min, load: 1.96 MPa, and nozzle: 1 mm φ×1 mm).

Preparation Example 1 of Resin

The raw material monomers as shown in Table 1 and 0.1 parts by weight of hydroquinone, based on 100 parts by weight of an entire amount of the raw materials were mixed and reacted under nitrogen gas atmosphere at 210° C. Thereafter, the ingredients were further reacted under reduced pressure to proceed with the reaction, to give a resin.

TABLE 1

|  | BPA-PO[1] | BPA-EO[2] | Fumaric Acid | Terephthalic Acid | Dodecenyl-succinic Acid | Trimellitic Anhydride | Softening Point (° C.) |
| --- | --- | --- | --- | --- | --- | --- | --- |
| Resin A | 80 | 20 | 80 |  |  | 20 | 150 |
| Resin B | 80 | 20 | 65 | 15 |  | 20 | 150 |
| Resin C | 80 | 20 | 50 | 30 |  | 20 | 150 |
| Resin D | 50 | 50 | 85 |  |  | 15 | 150 |
| Resin E | 50 | 50 | 100 |  |  |  | 140 |
| Resin F | 80 | 20 | 80 |  |  | 20 | 140 |
| Resin G | 80 | 20 | 80 |  |  | 20 | 125 |
| Resin H | 100 |  | 80 |  |  | 20 | 150 |
| Resin I | 80 | 20 | 75 |  |  | 25 | 148 |
| Resin J | 80 | 20 | 65 | 15 |  | 20 | 155 |
| Resin K | 80 | 20 | 75 |  |  | 25 | 155 |

TABLE 1-continued

|  | BPA-PO[1)] | BPA-EO[2)] | Fumaric Acid | Terephthalic Acid | Dodecenyl-succinic Acid | Trimellitic Anhydride | Softening Point (° C.) |
|---|---|---|---|---|---|---|---|
| Resin L | 80 | 20 | 79.07 |  | 0.03 | 20 | 155 |
| Resin M | 80 | 20 | 70 |  | 10 | 20 | 145 |

Note) The amounts used are expressed by a molar ratio.
[1)]Propylene oxide adduct of bisphenol A (average number of moles added: 2.2 moles).
[2)]Ethylene oxide adduct of bisphenol A (average number of moles added: 2.2 moles).

Preparation Example 2 of Resin

The raw material monomers as shown in Table 2 and 0.2 parts by weight of dibutyltin oxide (esterification catalyst), based on 100 parts by weight of an entire amount of the raw materials were mixed and reacted under nitrogen gas atmosphere at 230° C., to give a resin.

TABLE 2

|  | BPA-PO[1)] | BPA-EO[2)] | Fumaric Acid | Terephthalic Acid | Dodecenyl-succinic Acid | Trimellitic Anhydride | Softening Point (° C.) |
|---|---|---|---|---|---|---|---|
| Resin a | 90 | 20 |  | 100 |  |  | 100 |
| Resin b | 90 | 20 |  | 100 |  |  | 105 |
| Resin c | 90 | 20 | 5 | 95 |  |  | 100 |
| Resin d | 90 | 20 | 30 | 70 |  |  | 100 |
| Resin e | 90 | 20 |  | 100 |  |  | 120 |
| Resin f | 90 | 20 |  | 100 |  |  | 85 |
| Resin g | 90 | 20 |  | 100 |  |  | 75 |
| Resin h | 90 | 20 |  | 99.97 | 0.03 |  | 105 |
| Resin i | 90 | 20 |  | 95 | 10 |  | 100 |
| Resin j | 90 | 20 |  | 80 |  | 20 | 100 |

Note) The amounts used are expressed by a molar ratio.
[1)]Propylene oxide adduct of bisphenol A (average number of moles added: 2.2 moles).
[2)]Ethylene oxide adduct of bisphenol A (average number of moles added: 2.2 moles).

Examples 1 to 9 and Comparative Examples 1 to 8

One-hundred parts by weight of an entire amount of the resin binders of the combination and the formulation amounts as shown in Table 3, 7 parts by weight of carbon black "MOGUL-L" (commercially available from Cabot Corporation), 2 parts by weight of a low-molecular weight polypropylene "Biscol 660P" (softening point: 130° C., commercially available from Sanyo Chemical Industries, Ltd.), and 1 part by weight of a charge control agent "BONTRON S-34" (commercially available from Orient Chemical Co., Ltd.) were previously mixed, and thereafter the mixture was melt-kneaded with a twin-screw extruder "PCM-30" (commercially available from IKEGAI Corporation). The kneaded mixture was cooled, and then subjected to ordinary pulverization and classification steps, to give a powder having a volume-average particle size of 10 $\mu$m.

Here, an average particle size of a powder obtained by setting the treating speed to 120 g/min during pulverization step was determined, and the pulverizability of the powder was evaluated as follows:

○: Those having an average particle size of less than 10 $\mu$m.
×: Those having an average particle size of 10 $\mu$m or more.

The results are shown in Table 3.

The amount 0.3 parts by weight of a hydrophobic silica "H-2000" (commercially available from Wacker Chemical) was mixed with a Henschel mixer to deposit on 100 parts by weight of the resulting powder, to give a toner.

Thirty-nine parts by weight of the resulting toner and 1261 parts by weight of styrene-methyl methacrylate resin-coated ferrite powder (average particle size: 100 $\mu$m) were mixed, to give a developer.

Test Example 1

This developer was loaded in a commercially available two-component dry-type copy machine (a modified apparatus of "SF9800," commercially available from Sharp Corporation; a rotation speed of the fixing roller being set at 390 mm/sec, and a heat roller temperature in the fixing device being made variable, oil-applying device being removed from the apparatus). With sequentially raising the temperature of the fixing roller from 90° to 240° C., the development of fixed images was carried out at each temperature. The fixing ability was evaluated by the following methods. The results are shown in Table 3.

(1) Lowest Fixing Temperature

The lowest fixing temperature used herein is referred to the temperature of the fixing roller at which the fixing ratio of the toner exceeds 70%. This fixing ratio of the toner is determined by placing a load of 500 g on a sand-rubber eraser having a bottom area of 15 mm×7.5 mm on a fixed toner image obtained at each temperature, moving the loaded eraser on the image backward and forward five times, measuring the optical reflective density of the image before or after the eraser treatment with a reflective densitometer "RD-915" manufactured by Macbeth Process Measurements Co., and then calculating the fixing ratio by the following equation.

$$\text{Fixing Ratio (\%)} = \frac{\text{Optical Density After Eraser Treatment}}{\text{Optical Density Before Eraser Treatment}} \times 100$$

(2) Hot-Offset Generating Temperature

Fixed images are developed at each temperature of from 150° to 240° C., and subsequently blank image-transfer paper is conveyed through the fixing roller under the same conditions as above. Whether or not the toner staining is generated is visually observed. The "hot offset generating temperature" is referred to a lowest temperature of the fixing roller at which toner dusts were generated on the blank paper.

Test Example 2

Ten grams of a toner was placed in a 100-ml glass bottle, and allowed to stand, under environmental conditions of a temperature of 50° C. and a humidity of 60% for one week. The extent of aggregation of the toner after allowing it to stand was visually examined, and the storage property was evaluated according to the following criteria. The results are shown in Table 3.
(Evaluation Criteria)
○: No aggregation being observed;
Δ: Slight aggregation being observed; and
×: Much aggregation.

Test Example 3

Odor test was conducted by placing 5 g of toner on a hot plate set at 180° C., and 5 individuals were asked to smell its odor. The number of individuals who sensed the odor was counted. The results are shown in Table 3.

dicarboxylic acid compound in the linear polyester is small, the resin binder is poor in the pulverizability and the toner is poor in the storage property.
5) It is seen from the results of Example 5 and Comparative Example 5 that when the softening point of the linear polyester is high, the resin binder is poor in the pulverizability and the toner is poor in the fixing ability.
6) It is seen from the results of Example 6 and Comparative Example 6 that when the softening point of the linear polyester is low, the toner is poor in the offset resistance and the storage property, and also generates odor.
7) It is seen from the results of Examples 7 and 8 that the resin binder and the toner exhibit excellent properties even when the ratio of the nonlinear polyester to linear polyester is 70/30.
8) It is seen from the results of Examples 1 and 9 and Comparative Example 7 that when the amount of the alkenylsuccinic acid is large, the resin binder is poor in the pulverizability and the toner is poor in the storage property, and drastically generates odor.
9) It is seen from the results of Example 1 and Comparative Example 8 that when the amount of the trivalent raw material monomer in the low-softening point polyester is large, the toner is poor in the fixing ability and the storage property.

TABLE 3

| | Resin Binder | | Pulverizability* | Lowest Fixing Temp. (° C.) | Hot Offset Generating Temp. (° C) | Storage Property | Odor |
|---|---|---|---|---|---|---|---|
| Ex. 1 | Resin A/50 | Resin a/50 | ○ (9.1) | 125 | 240 or more | ○ | 0 |
| Ex. 2 | Resin B/50 | Resin a/50 | ○ (8.9) | 128 | 238 | ○ | 0 |
| Comp. Ex. 1 | Resin C/50 | Resin a/50 | ○ (8.8) | 140 | 180 | ○ | 0 |
| Ex. 3 | Resin D/50 | Resin a/50 | ○ (9.8) | 126 | 220 | ○ | 0 |
| Comp. Ex. 2 | Resin E/50 | Resin a/50 | X (12.5) | 135 | 175 | ○ | 0 |
| Ex. 4 | Resin F/50 | Resin a/50 | ○ (9) | 125 | 238 | ○ | 0 |
| Comp. Ex. 3 | Resin G/50 | Resin a/50 | ○ (8.3) | 110 | 150 or less | X | 0 |
| Ex. 5 | Resin H/50 | Resin c/50 | ○ (9.6) | 126 | 240 or more | ○ | 0 |
| Comp. Ex. 4 | Resin H/50 | Resin d/50 | X (11) | 124 | 240 or more | Δ | 0 |
| Comp. Ex. 5 | Resin H/50 | Resin e/50 | X (10.9) | 141 | 240 or more | ○ | 1 |
| Ex. 6 | Resin I/50 | Resin f/50 | ○ (9) | 123 | 240 or more | ○ | 0 |
| Comp. Ex. 6 | Resin I/50 | Resin g/50 | ○ (8.8) | 120 | 190 | X | 2 |
| Ex. 7 | Resin J/70 | Resin b/30 | ○ (9.8) | 130 | 240 or more | ○ | 0 |
| Ex. 8 | Resin K/70 | Resin b/30 | ○ (7.9) | 119 | 231 | ○ | 0 |
| Ex. 9 | Resin L/50 | Resin h/50 | ○ (8.9) | 124 | 240 or more | ○ | 0 |
| Comp. Ex. 7 | Resin M/50 | Resin i/50 | X (10.2) | 125 | 240 or more | X | 5 |
| Comp. Ex. 8 | Resin A/50 | Resin j/50 | ○ (9.2) | 138 | 240 or more | X | 1 |

Note*: The value inside parenthesis is an average particle size (μm) of the resulting powder The followings are found from the table:

1) It is seen from the results of Examples 1 and 2 and Comparative Example 1 that when the amount of the aliphatic dicarboxylic acid compound in the nonlinear polyester is small, the toner is poor in the fixing ability and the offset resistance.
2) It is seen from the results of Example 3 and Comparative Example 2 that when the amount of the trivalent raw material monomer in the high-softening point polyester is small, the resin binder is poor in the pulverizability and the toner is poor in the offset resistance.
3) It is seen from the results of Examples 1 and 4 and Comparative Example 3 that when the softening point of the nonlinear polyester is low, the toner is poor in the offset resistance and the storage property.
4) It is seen from the results of Example 5 and Comparative Example 4 that when the amount of the aromatic According to the present invention, there can be provided a resin binder which is excellent in fixing ability, offset resistance, storage property and pulverizability and generates little odor even when used as a resin binder for a toner, and a toner comprising the resin binder.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A resin binder comprising a nonlinear polyester having a softening point of from 130° to 160° C. and a linear polyester having a softening point of from 80° to 110° C., wherein the nonlinear polyester comprises polycondensed units of an alcohol component and a carboxylic acid component, wherein 1) a polycondensed aliphatic dicarboxylic acid compound is present in an amount of 60% by mol or more of the carboxylic acid component;
2) from 0 to 0.1% by mol of the carboxylic acid component is a polycondensed alkenylsuccinic acid compound; and
3) at least one component selected from the group consisting of:
   (i) a polycondensed trihydric or higher polyhydric alcohol present in an amount of from 0.1 to 40% by mol of the alcohol component; and
   (ii) a polycondensed tricarboxylic or higher polycarboxylic acid component present in an amount of from 0.1 to 40% by mol of the carboxylic acid component, and wherein the linear polyester comprises polycondensed units of an alcohol component and a carboxylic acid component, wherein 1) an a polycondensed aromatic dicarboxylic acid compound is present in an amount of 90% by mol or more of the carboxylic acid component; and
2) at least one of
   from 0 to 0.05 % by mol of the alcohol component is at least one of a trihydric or higher polyhydric alcohol, or
   from 0 to 0.05% by mol of the carboxylic acid component is a tricarboxylic acid compound.

2. The resin binder according to claim 1, wherein the alkenylsuccinic acid compound is present in the linear polyester, in an amount of 0.1% by mol or less of the carboxylic acid component.

3. The resin binder according to claim 1, wherein the weight ratio of the nonlinear polyester to the linear polyester is from 90/10 to 20/80.

4. The resin binder according to claim 3, wherein the weight ratio of the nonlinear polyester to the linear polyester is from 80/20 to 30/70.

5. The resin binder according to claim 1, wherein each of the nonlinear polyester and the linear polyester comprises polycondensed units of an alcohol component comprising as a main component a compound represented by formula (I):

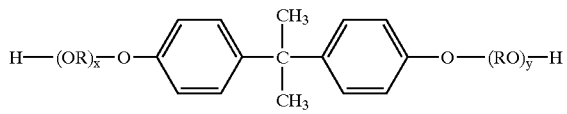

(I)

wherein R is an alkylene group having 2 or 3 carbon atoms; x and y are a positive number; and the sum of x and y is from 1 to 16.

6. The resin binder according to claim 5, wherein the compound represented by formula (I) is present in an amount of 50% by mol or more of the alcohol component.

7. The resin binder according to claim 1, wherein the aliphatic dicarboxylic acid compound in the nonlinear polyester is an aliphatic dicarboxylic acid having 2 to 10 carbon atoms.

8. The resin binder according to claim 1, wherein the aliphatic dicarboxylic acid compound is present in the nonlinear polyester in an amount of from 65 to 90% by mol of the carboxylic acid component.

9. The resin binder according to claim 1, wherein the aromatic dicarboxylic acid compound in the linear polyester is at least one member selected from the group consisting of phthalic acid, terephthalic acid, isophthalic acid, acid anhydrides thereof and $C_{1-3}$ alkyl esters thereof.

10. The resin binder according to claim 1, wherein the aromatic dicarboxylic acid compound is present in the linear polyester in an amount of from 95 to 100% by mol of the carboxylic acid component.

11. The resin binder according to claim 1, wherein the nonlinear polyester has a softening point of from 140° to 160° C., and wherein the linear polyester has a softening point of from 85° to 107° C.

12. A toner comprising the resin binder of claim 1.

13. The resin binder according to claim 1, wherein no alkenylsuccinic acid compound is present in the linear polyester.

14. The resin binder of claim 1, wherein no alkenylsuccinic acid compound is present in the nonlinear polyester.

15. The resin binder of claim 1, wherein no trihydric alcohol or higher polyhydric alcohol is present in the linear polyester.

16. The resin binder of claim 1, wherein no tricarboxylic acid or higher polycarboxylic acid compound is present in the linear polyester.

17. The resin binder of claim 1, wherein the nonlinear polyester comprises polycondensed units of a trihydric alcohol or a higher polyhydric alcohol selected from the group consisting of sorbitol, pentaerythritol, glycerol and trimethylolpropane.

18. The resin binder of claim 1, further comprising at least one selected from the group consisting of a styrene-acrylic resin, a composite resin of a polyester and a styrene-acrylic resin, an epoxy resin and a urethane resin.

19. The resin binder of claim 1, wherein the nonlinear polyester comprises from 15 to 25 mol % of a tricarboxylic acid and from 75 to 85 mol % of fumaric acid.

20. The resin binder of claim 1, wherein the aromatic dicarboxylic acid compound in the linear polymer is terephthalic acid.

* * * * *